S. NICKERSON.
SIEVE.
APPLICATION FILED AUG. 8, 1910.
1,019,347.
Patented Mar. 5, 1912.
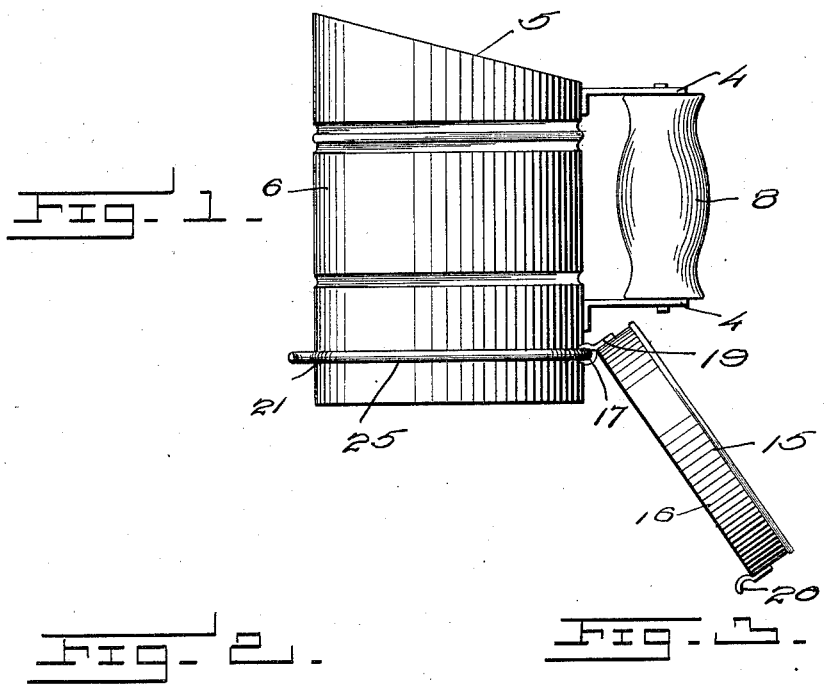
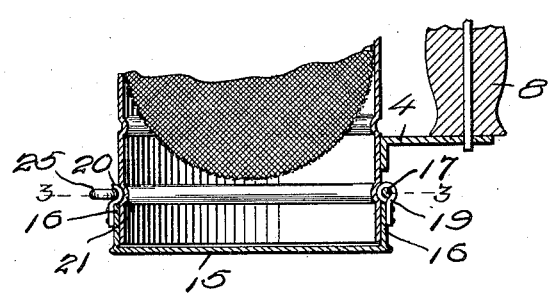
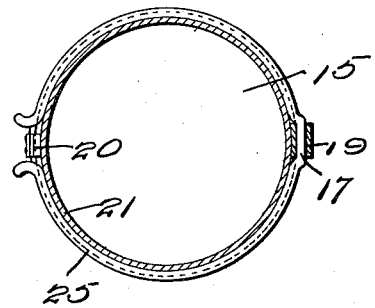
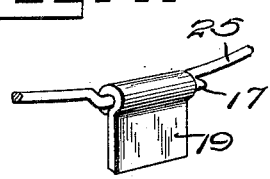
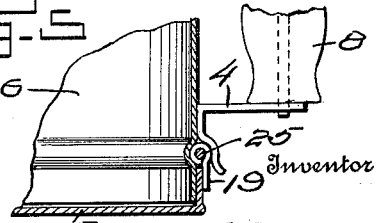
Witnesses
Inventor
Susan Nickerson
By Woodward & Chandlee
Attorneys

UNITED STATES PATENT OFFICE.

SUSAN NICKERSON, OF PORTLAND, OREGON.

SIEVE.

1,019,347. Specification of Letters Patent. Patented Mar. 5, 1912.

Application filed August 8, 1910. Serial No. 576,137.

*To all whom it may concern:*

Be it known that I, SUSAN NICKERSON, a citizen of the United States, residing at Portland, in the county of Multnomah and State of Oregon, have invented certain new and useful Improvements in Sieves, of which the following is a specification.

This invention relates to sieves, and has for an object to provide a hinged closure for the screen or delivery end of the sieve to cover the same when the said sieve is not in use.

A further object of the invention is to provide a closure of this character which may be removably attached to the sieve of various constructions.

With these and other objects in view, the present invention consists in the combination and arrangement of parts which will be hereinafter more fully described and particularly pointed out in the appended claim.

In the drawings forming a part of this specification and in which like numerals indicate similar parts in the several views, Figure 1 is a side elevational view of the sieve form embodying my invention. Fig. 2 is a vertical longitudinal sectional view with portions broken away. Fig. 3 is a horizontal sectional view on lines 3—3 of Fig. 2. Fig. 4 is a detailed perspective view of the attaching member for the cover. Fig. 5 is a side elevational view of a modified form.

This invention relates to that class of sieves which serve as a scoop for dipping up flour or like substances and from which the flour is sifted as needed, said sifter serving as a magazine. The sifter or screen which forms the bottom of the scoop has a tendency to permit the flour or the material contained within the scoop to pass through the screen and thereby cause an unnecessary waste of material.

The present invention is designed especially to overcome the objections referred to by providing the scoop with a cap or closure provided with a detachable clamping yoke adapted for interlocking engagement with a circumferential groove formed in the body of the scoop adjacent to its delivery end by means of which the closure cap is sprung upon and removably held in its proper position upon the scoop to form a hinged bottom for the same.

In carrying out the objects of the invention, I employ a scoop comprising a cylindrical housing 6, preferably in the form of an open ended scoop, which has a scarf upper end 5, said scoop having a circumscribing groove 21 which is located adjacent or at a suitable distance from the delivery end of the scoop as clearly shown in Fig. 1 of the drawings. Secured to the scoop 6 and properly separated from one another are two perforated ears 4, to which the handle 8 is fixed.

The scoop 6 serves as a receptacle from which the flour is sifted as may be required. In order to prevent the flour from accidentally passing through the sieve, a closure cap 15 is employed having an annular flange 16 which snugly encircles the lower end of the scoop when the said cap is in a closed position. Secured to the flange is an ear 19 which is positioned oppositely to the spring clasp 20 the latter being so arranged that its bent or curved ends engage within the circumscribing groove 21 when the cap is attached and in a closed position. Secured intermediate of its ends within the ear 19 is a split or open seam ring 25 having the off set portion 17 for proper engagement with said ear, whereby the said ring is hingedly attached to the cap. The ring 25 referred to is made of spring wire and has its terminal ends bent outwardly and properly spaced in respect to one another, whereby the ring is snugly received by the circumscribing groove 21 for detachably securing the closure cap 15 in its proper position in respect to the delivery end of the scoop.

By means of the ring 25 which forms an elastic circular yoke, the cap can be easily sprung upon or detached from the scoop, the said yoke being securely held by its own flexibility within the circumscribing groove 21 as clearly shown.

By the construction as herein shown and described a desired amount of sifted flour may be retained within the cap when the latter is in a closed position, and when the said cap is released from its locked position the flour contained within the scoop may be readily sifted through the screen contained therein in the usual manner.

It will be apparent that changes in the form, proportion, and minor details of construction may be resorted to without departing from the spirit or sacrificing any of the advantages of this invention.

By referring to the modification shown in Fig. 5 is will be seen that the lower ear 4 extends a suitable distance downwardly and is provided with an outwardly curved interlocking recess for the reception of the looped end of the attaching member carried by the annular flange of the closure cap 15, thereby dispensing with the off set portions 17, and acting as a stop for limiting the movement of the cap 15 when the same is opened and further forming a very desirable construction for the purpose intended.

What is claimed is:

The combination with an open ended receptacle having a peripheral groove formed therein near the open end, of a handle bracket having a depending curved portion extending across the groove and outwardly at an angle to the receptacle, a resilient split ring fitting into the groove, a closure cap for the end of the receptacle pivoted to the ring and having its movement limited by the depending portion of the handle bracket, and a resilient clasp carried by the cap for engagement in the groove between the ends of the split ring for locking the cap in closed position.

In testimony whereof I affix my signature, in the presence of two witnesses.

SUSAN NICKERSON.

Witnesses:
JOHN H. WOODWARD,
E. J. COWLISHAW.

Copies of this patent may be obtained for five cents each, by addressing the "Commissioner of Patents, Washington, D. C."